Patented Jan. 10, 1950

2,494,031

UNITED STATES PATENT OFFICE 2,494,031

DIMETHINE MEROCYANINE DYES

Leslie G. S. Brooker and Frank L. White, Rochester, N. Y., assignors to Eastman Kodak Company, Rochester, N. Y., a corporation of New Jersey No Drawing. Application June 23, 1945,
Serial No. 601,332

17 Claims. (Cl. 260—240)

This invention relates to dimethine merocyanine dyes and to a process for the preparation thereof. This application is a continuation-in-part of our copending application Serial No. 519,354, filed January 22, 1944 (now United States Patent 2,478,366, dated August 9, 1949).

Dimethine merocyanine (merocarbocyanine) dyes containing an alkyl group on the dimethine chain are known (see United States Patent 2,263,757, dated November 25, 1941). In these known dimethine merocyanine dyes, the alkyl group is on the methine group adjacent to the keto nucleus as shown in the following general formula:

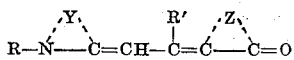

wherein R and R' represent alkyl groups, Y represents the non-metallic atoms necessary to complete a benzothiazole, a benzoselenazole, a naphthothiazole nucleus, etc., and Z represents the non-metallic atoms necessary to complete a 5-membered or 6-membered heterocyclic nucleus, e. g. a rhodanine nucleus, a 2-thio-2,4(3,5)-oxazoledione nucleus or a thiobarbituric acid nucleus.

We have now found dimethine merocyanine dyes containing an alkoxyl or an aryloxyl group on the dimethine chain, the alkoxyl or aryloxyl group being on the methine group removed from the keto nucleus rather than on the methine group adjacent to the keto nucleus. We have further found that these new dyes sensitize photographic silver halide emulsions.

It is, accordingly, an object of our invention to provide new dyes. A further object is to provide a process for preparing such dyes. Other objects will become apparent hereinafter.

The dimethine merocyanine dyes of our invention can be represented by the following general formula:

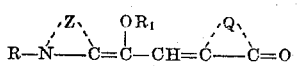

wherein R represents an alkyl group of the formula $C_nH_{2n+1}$ wherein $n$ represents a positive integer, $R_1$ represents a member selected from the group consisting of alkyl groups, aryl groups of the benzene series and aryl groups of the naphthalene series, Z represents the non-metallic atoms necessary to complete a heterocyclic nucleus selected from those consisting of those of the benzoxazole series, those of the benzothiazole series, those of the benzoselenazole series, those of the α-naphthothiazole series, those of the β-naphthothiazole, those of the α-naphthoxazole series and those of the β-naphthoxazole series, and Q represents the non-metallic atoms necessary to complete a heterocyclic nucleus selected from those consisting of those of the rhodanine series (e. g. rhodanine, 3-alkylrhodanines or 3-phenylrhodanines) and those of the 2-thio-2,4(3,5)-oxazoledione series (e. g. 3-alkyl-2,4(3,5)-oxazolediones). Of the dyes formulated above, those in which R represents an alkyl group of the formula $C_nH_{2n+1}$ wherein $n$ represents a positive integer of from 1 to 2 sensitize photographic emulsions strongly.

In accordance with our invention, we prepare our new dimethine merocyanine dyes by condensing a cyclammonium quaternary salt selected from those consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series containing in the α-position to the quaternary nitrogen atom a group selected from the group consisting of alkoxymethyl groups, aryloxymethyl groups of the benzene series and aryloxymethyl groups of the naphthalene series, with a heterocyclic compound of the following general formula:

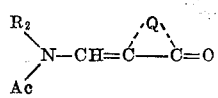

wherein Ac represents an acyl group and $R_2$ represents an aryl group and Q has the value given above. The condensations are advantageously carried out in the presence of a basic condensing agent. An alcoholic solution of a trialkylamine, e. g. triethylamine, or a N-alkylpiperidine, e. g. N-methylpiperidine, is advantageously employed as basic condensing agent. Heat accelerates the condensations.

Our new dimethine merocyanine dyes can also be prepared by condensing a cyclammonium quaternary salt selected from those consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series, containing in the α-position to the quaternary nitrogen atom, a β-arylamino-α-alkoxy- or α-aryloxyvinyl group, with a heterocyclic compound containing a ketomethylene group selected from those consisting of those of the rhodanine series (e. g. rhodanine, 3-alkylrhodanines or 3-phenylrhodanines) and those of the 2-thio-2,4(3,5)-oxazoledione series (e. g. 3-alkyl-2-thio-2,4(3,5)-oxazolediones). The condensations are advantageously carried out in the presence of a basic condensing agent. An alcoholic solution of a trialkylamine (e. g. triethylamine) or a N-alkylpiperidine (e. g. N-methylpiperidine) is advantageously employed as basic condensing agent. Heat accelerates the condensations.

The following examples will serve to illustrate our new dimethine merocyanine dyes and the manner of obtaining the same.

*Example 1.—3 - ethyl - 5 - [(3 - methyl - 2(3) - benzothiazolylidene) - β - phenoxyethylidene] rhodanine*

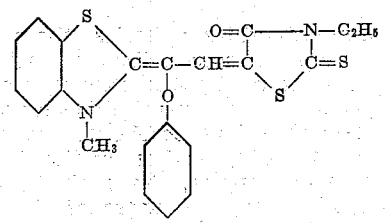

2.3 g. (1 mol.) of 2-(β-acetanilido-α-phenoxyvinyl)-benzothiazole methiodide, 0.7 g. (1 mol.) of 3-ethylrhodanine, 10 cc. of ethyl alcohol and 0.46 g. (1 mol.+5 per cent excess) of triethylamine were heated at the refluxing temperature for 15 minutes. The cool reddish mixture was stirred with 150 cc. of ether and the suspension was chilled at 0° C., filtered and the solid was washed with ether. The residue was stirred with 10 cc. of hot ethyl alcohol and after chilling at 0° C. the dye was washed on the filter with ethyl alcohol. The yield of dye was 32 per cent crude and 10 per cent after one recrystallization from methyl alcohol (140 cc. per gram of dye). The purple crystals had melting point 197–199° C. with decomposition, and sensitized a photographic gelatino-silver-bromo-iodide emulsion to about 650 mu. with maximum sensitivity at about 615 mu.

*Example 2.—3 - ethyl - 5 - [(3 - methyl - 2(3) - benzothiazolylidene) - β - (m - toloxy) ethylidene] rhodanine*

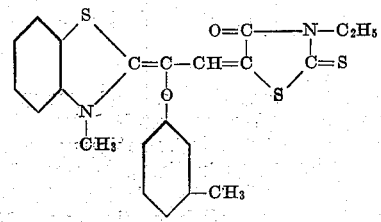

2.55 g. (1 mol.) of 2-(m-toloxymethyl)benzothiazole and 1.26 g. (1 mol.) of methyl sulfate were heated together at the temperature of the steam bath for 8 hours. To the crude quaternary salt were added 3.06 g. (1 mol.) of 5-acetanilidomethylene-3-ethylrhodanine, 10 cc. of ethyl alcohol and 1.06 g. (1 mol.+5 per cent excess) of triethylamine. This reaction mixture was heated at the refluxing temperature for 20 minutes. After chilling at 0° C., the solid was collected on a funnel and washed with ethyl alcohol. The residue was stirred, in a beaker, with hot ethyl alcohol and after chilling the suspension at 0° C., the dye was washed on the funnel with ethyl alcohol. The yield of dye was 67 per cent crude and 33 per cent after two recrystallizations from acetone (135 cc. per gram of dye). The minute dark red crystals with a green reflex had melting point 228–229° C. with decomposition, and sensitized a photographic gelatino-silver-bromo-iodide emulsion to about 650 mu. with maximum sensitivity at about 615 mu.

*Example 3.—3 - ethyl - 5 - [(3 - methyl - 2(3) - benzothiazolylidene) - β - (m - toloxy) ethylidene] - 2 - thio - 2,4(3,5) - oxazoledione*

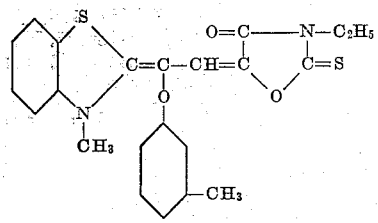

2.55 g. (1 mol.) of 2-(m-toloxymethyl)benzothiazole and 1.26 g. (1 mol.) of methyl sulfate were heated together at the temperature of the steam bath for 8 hours. To the crude quaternary salt were added 2.90 g. (1 mol.) of 5-acetanilidomethylene - 3 - ethyl - 2 - thio - 2,4(3,5) - oxazoledione, 10 cc. of ethyl alcohol and 1.06 g. (1 mol.+5 per cent excess) of triethylamine. This reaction mixture was heated at the refluxing temperature for 20 minutes. After chilling the mixture at 0° C., the solid was collected on a funnel and washed with ethyl alcohol. The residue was stirred, in a beaker, with hot ethyl alcohol and after chilling the suspension at 0° C., the solid was washed on a funnel with ethyl alcohol. The yield of dye was 73 per cent crude and 59 per cent after two recrystallizations from ethyl alcohol (165 cc. per gram of dye). The reddish-orange crystals with a green reflex had melting point 195°–197° C. with decomposition, and sensitized a photographic gelatino - silver - bromo - iodide emulsion to about 620 mu. with maximum sensitivity at about 580 mu.

*Example 4.—3-ethyl-5-[(3-ethyl-2(3)-benzothiazolylidene)-β-(m-toloxy) ethylidene] rhodanine*

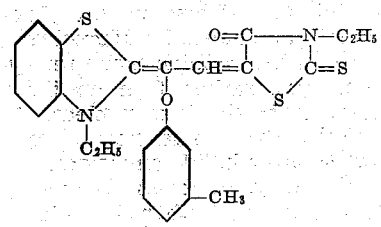

2.55 g. (1 mol.) of 2-(m-toloxymethyl)benzothiazole and 1.54 g. (1 mol.) of ethyl sulfate were heated together at 105–110° C. for 4 days. To the crude quaternary salt were added 3.06 g. (1 mol.) of 5 - acetanilidomethylene - 3 - ethylrhodanine, 10 cc. of ethyl alcohol and 1.06 g. (1 mol.+5 per cent excess) of triethylamine. This reaction mixture was heated at the refluxing temperature for 20 minutes. The cool mixture was stirred with 300 cc. of ether and after chilling at 0° C., the solid was washed on a funnel with ether. The residue was stirred, in a beaker, with hot ethyl alcohol and after chilling at 0° C., the product was washed on a funnel with ethyl alcohol. The yield of dye was 25 per cent crude and 17 per cent after two recrystallizations from acetone (50 cc. per gram of dye). The dark red crystals with a green reflex had melting point 210–211° C. with decomposition, and sensitized a photographic gelatino-silver-bromo-iodide emulsion to about 650 mu. with maximum sensitivity at about 610 mu.

*Example 5.—3-ethyl-5-[(3-ethyl-2(3)-benzothiazolylidene)-β-(m-toloxy) ethylidene]-2-thio-2,4(3,5)-oxazoledione*

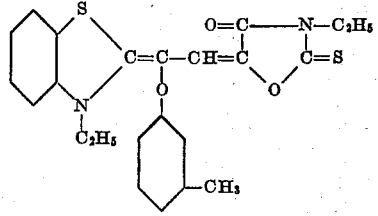

2.55 g. (1 mol.) of 2-(m-toloxymethyl)benzothiazole and 1.54 g. (1 mol.) of ethyl sulfate were heated together at 105–110° C. for 4 days. To the crude quaternary salt were added 2.90 g. (1 mol.) of 5-acetanilidomethylene-3-ethyl-2-thio-2,4 (3,5)-oxazoledione, 10 cc. of ethyl alcohol and 1.06 g. (1 mol.+5 percent excess) of triethylamine. This reaction mixture was heated at the refluxing temperature for 20 minutes. The cool mixture was stirred with 150 cc. of ether and after chilling at 0° C., the solid was washed on a funnel with ether. The residue was stirred, in a beaker, with 10 cc. of hot ethyl alcohol and after chilling the suspension at 0° C., the product was washed on a funnel with ethyl alcohol. The yield of dye was 66 per cent crude and 46 per cent after two recrystallizations from acetone (120 cc. per gram of dye). The orange-red needles with a green reflex had melting point 223°–224° C. with decomposition, and sensitized a photographic gelatino-silver-bromo-iodide emulsion to about 610 mu. with maximum sensitivity at about 580 mu.

*Example 6.—3-ethyl-5-[(3-methyl-2(3)-benzoxazolylidene)-β-(p-chlorophenoxy) ethylidene]rhodanine*

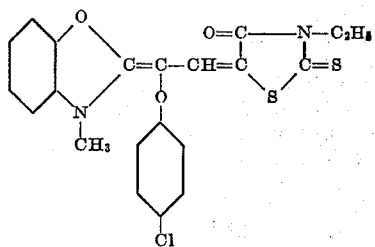

2.60 g. (1 mol.) of 2-(p-chlorophenoxymethyl) benzoxazole and 1.28 g. (1 mol.) of methyl sulfate were heated together at 105–110° C. for 37 hours. To the crude quaternary salt were added 3.06 g. (1 mol.) of 5-acetanilidomethylene-3-ethyl rhodanine, 15 cc. of dry pyridine and 1.01 g. (1 mol.) of triethylamine. This reaction mixture was heated at the refluxing temperature for 25 minutes. The cool mixture was stirred with 200 cc. of ether and after chilling at 0° C. the solids were collected on a filter and washed with ether. The residue was stirred, in a beaker, with 10 cc. of hot ethyl alcohol and after chilling the suspension at 0° C., the solid was washed on a filter with ethyl alcohol. The dye was recrystallized twice from acetone (110 cc. per gram of dye) and obtained in a 6 per cent yield. The light red crystals with a blue reflex had melting point 283–284° C. with decomposition, and sensitized a photographic gelatino-silver-bromo-iodide emulsion to about 610 mu. with maximum sensitivity at about 575 mu.

*Example 7.—3-ethyl-5-[(5-chloro-3-methyl-2(3)-benzoxazolylidene)-β-phenoxyethylidene]-2-thio-2,4(3,5)-oxazoledione*

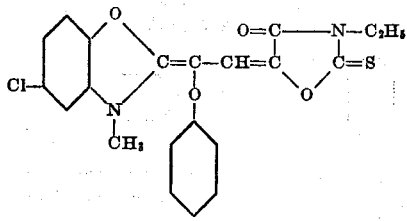

2.60 g. (1 mol.) of 5-chloro-2-phenoxymethylbenzoxazole and 1.26 g. (1 mol.) of methyl sulfate were heated together at 105–110° C. for 37 hours. To the crude quaternary salt were added 2.90 g. (1 mol.) of 5-acetanilidomethylene-3-ethyl-2-thio-2,4(3,5)-oxazoledione, 15 cc. of pyridine and 1.01 g. (1 mol.) of triethylamine. This reaction mixture was heated at the refluxing temperature for 25 minutes. The cool reaction mixture was stirred with 150 cc. of ether and after chilling at 0° C., the solid was washed on a funnel with ether. The residue was stirred, in a beaker, with 10 cc. of hot ethyl alcohol and after chilling the suspension at 0° C., the product was washed on a funnel with ethyl alcohol. The yield of dye was 16 per cent crude and 9 per cent after two recrystallizations from acetone (325 cc. per gram of dye). The minute light orange crystals had melting point 291–292° C. with decomposition, and sensitized a photographic gelatino-silver-bromo-iodide emulsion to about 560 mu.

*Example 7a.—5-[3-ethyl-2(3)-benzothiazolylidene)-β-methoxyethylidene]-3-phenylrhodanine*

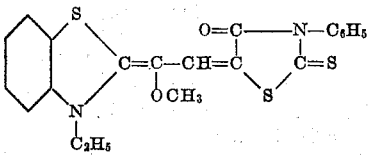

1.79 g. (1 mol.) of 2-methoxymethylbenzothiazole and 1.54 g. (1 mol.) of ethyl sulfate were heated together at the temperature of the stream bath for about 3 days. To the resulting crude quaternary salt were added 3.54 g. (1 mol.) of 5-acetanilidomethylene-3-phenylrhodanine, 50 cc. of ethyl alcohol and 1.06 g. (1 mol.+5% excess) of triethylamine. The reaction mixture was heated at the refluxing temperature for 30 minutes. After chilling at 0° C., the solid was collected on the filter and washed with methyl alcohol. The residue was stirred, in a beaker, with acetone and filtered. The yield of crude dye was 1.0 g. (23% of the theory). The dye was purified by stirring it with 45 cc. of boiling acetic acid and filtering hot. The undissolved portion was recrystallized from 145 cc. of acetic acid. After another recrystallization from acetic acid, the yield of dye was 8 per cent. The green crystals had melting point 283–285° C. with decomposition. The dye sensitized a photographic gelatino-silver-bromiodide emulsion to about 640 mu. with maximum sensitivity at about 540 and 600 mu., the former being the stronger.

The cyclammonium quaternary salts containing, in the α-position, an alkoxymethyl group or an aryloxymethyl group are prepared as shown in the foregoing examples, by adding an alkyl salt to heterocyclic bases containing an alkoxymethyl or an aryloxymethyl group, in the α-position. The following examples will serve to illustrate the preparation of these heterocyclic bases.

*Example 8.*—2 - (p - Methoxyphenoxymethyl)-benzoxazole

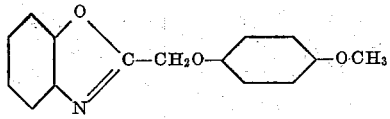

40.3 g. of 2-(p-methoxyphenoxyacetylamino)-phenol and 13 g. of phosphorus pentoxide were intimately mixed and the mixture was heated at 170° C. for 30 minutes. The liquid portion was poured, with stirring, into 800 cc. of 3 per cent aqueous sodium carbonate and the residue remaining in the reaction flask was treated with 200 cc. of hot 3 per cent aqueous sodium carbonate. Both portions were combined and thoroughly extracted with ether. The ether layer was collected and washed with water. After distilling off the ether, the residue distilled at 182°–190° C. at 2 mm. The product was poured into a small volume of methyl alcohol. After chilling, the crystals were washed on the funnel with methyl alcohol. The yield of colorless crystals was 46 per cent and they had melting point 48°–50° C.

The 2 - (p - methoxyphenoxyacetylamino)-phenol was prepared as follows:

15.1 g. (1 mol.) of o-aminophenol was dissolved in 50 cc. of pyridine and 27.8 g. (1 mol) of p-methoxyphenoxyacetyl chloride was added slowly, with shaking, and then the mixture was heated at the temperature of the steam bath for 20 minutes. The mixture was poured, with stirring, into a solution of 20 g. of sodium carbonate dissolved in about 2 liters of water. The product separated as a sticky mass. The aqueous layer was decanted and the residue washed with water. It was dissolved in alcohol and precipitated by the addition of water. The product remained sticky. It was air dried and used without further purification.

The p-methoxyphenoxyacetyl chloride employed above was prepared as follows:

A mixture of 59.2 g. (1 mol.) of p-methoxyphenoxy acetic acid and 71.6 g. (2 mols.) of thionyl chloride was heated in a water bath having a temperature of 70°–75° C. for 2 hours. The mixture was distilled and the fraction distilling at 145°–152° C. at 15 mm. was collected as the acid chloride. Yield 94 per cent.

In a similar manner, 2 - phenoxymethyl - 5-phenylbenzoxazole was prepared as colorless crystals melting at 91°–92° C. Also in a similar manner, 5-chloro-2-phenoxymethyl benzoxazole was prepared as colorless crystals melting at 85°–88° C., 2 - (p - chlorophenoxymethyl) - benzoxazole was prepared as colorless crystals melting at 85°–86° C., 2-phenoxymethyl-β-naphthoxazole was prepared as colorless crystals melting at 72°–75° C. and 2-phenoxymethyl-α-naphthoxazole was prepared as colorless crystals melting at 102°–105° C.

*Example 9.*—2-ethoxymethylbenzoxazole

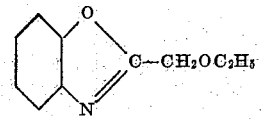

24 g. of ethoxyacetylaminophenol and 9 g. of phosphorus pentoxide were intimately mixed and the mixture was heated at 170° C. for 30 minutes. The reaction mixture was poured into 1 liter of 3 per cent aqueous sodium carbonate and the base extracted with ether. The ether layer was collected and washed with water. After distilling off the ether, the residue was distilled, and the distillate redistilled at 125°–132° C. at 20 mm. The yield of clear liquid was 23 per cent The 2-ethoxyacetylaminophenol was prepared as follows:

21.8 g. (1 mol.) of o-aminophenol was dissolved in 50 cc. of pyridine and 24.5 g. (1 mol.) of ethoxyacetyl chloride was added slowly, with shaking, and then the reaction mixture was heated at the temperature of the steam bath for 20 minutes. The mixture was poured, with stirring, into a solution of 20 g. of sodium carbonate dissolved in about 2 liters of water. The colorless crystals were washed, on the funnel, with cold water and the yield was 64 per cent.

*Example 10.*—m-Toloxymethylbenzothiazole

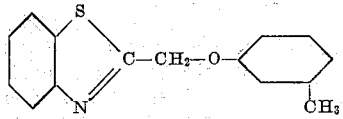

A solution of 55.2 g. (2 mols.) of m-toloxyacetyl chloride in 100 cc. of dry benzene was added over a period of 2 minutes to a suspension of 47 g. (1 mol.) of zinc o-aminophenylmercaptide and 11 g. of zinc chloride in 350 cc. of dry benzene with mechanical stirring. After 15 minutes at room temperature, the mixture was heated at the refluxing temperature for 45 minutes and filtered hot. The benzene filtrate was washed, in a separatory funnel, with 500 cc. of about 11 per cent sodium hydroxide and then three times with water. The residue obtained from filtering the reaction mixture was stirred, in a beaker, with 500 cc. of about 17 per cent sodium hydroxide and 300 cc. of benzene. After filtering, by gravity, the benzene layer was collected and washed with water. The benzene extracts were combined, dried over potassium carbonate, and the filtrate distilled. The fraction, which distilled at 193°–210° C. at 3 mm. was poured into ligroin (boiling point 60°–90° C.) and after chilling, the colorless crystals were washed on the funnel with ligroin. They had melting point 83°–85° C. The yield of base was 52 per cent crude and 32 per cent after the ligroin recrystallization.

In a similar manner, 2-ethoxymethylbenzothiazole boiling at 142°–147° C. at 10 mm. of mercury pressure was prepared, 2-(β-naphthoxymethyl)-benzothiazole was prepared, p-chlorophenoxymethyl-benzothiazole boiling at 225°–235° C. at 3 mm. of mercury pressure and melting at 83°–85° C. was prepared, 2-phenoxymethylbenzothiazole was prepared and 2-phenoxymethylbenzoselenazole melting at 100°–105° C. was prepared.

*Example 11.*—2-phenoxymethyl-α-naphthothiazole

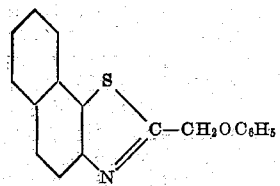

55.4 g. of phenoxyacetyl-β-naphthylamine and 50 cc. of dry pyridine were heated together, in an oil bath having a temperature of 115°–120° C. To this hot solution was added slowly 22 g. of phosphorus pentasulfide with mechanical stirring and the mixture was heated for about 15 minutes. After pouring the reaction mixture onto cracked ice an excess of acetic acid was added. The phenoxythioacetyl-β-naphthylamine, which separated was collected on a funnel. It was redissolved in an excess of dilute sodium hydroxide. The solution was filtered and to the filtrate was added some cracked ice and then an excess of acetic acid. Again the phenoxythioacetyl-β-naphthylamine, which separated was collected on a funnel. It was redissolved in an excess of dilute sodium hydroxide, cracked ice added and oxidized to the desired base by the addition of aqueous potassium ferricyanide until the mixture was permanently yellow. The base was removed by extraction with ether. The ether layer was washed with water and then it was dried over potassium carbonate. After filtering, the filtrate was concentrated and the residue recrystallized from ligroin (boiling point 90°–120° C.). The almost colorless crystals had melting point 118°–120° C.

*Example 12.—2-phenoxymethyl-β-naphthothiazole*

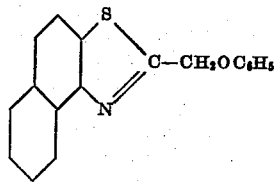

55.4 g. of phenoxyacetyl-α-naphthylamine and 250 cc. of dry benzene were heated to the refluxing temperature with mechanical stirring and 22 g. of phosphorus pentasulfide was added slowly and heating was continued for 20 minutes. The hot benzene layer was poured onto an equal volume of cracked ice and an excess of sodium hydroxide was added. The aqueous alkaline layer was isolated and made acid with acetic acid. The phenoxythioacetyl-α-naphthylamine, which separated was collected on a funnel and redissolved in an excess of warm dilute sodium hydroxide. After filtering the solution, to the filtrate was added some cracked ice and then an excess of acetic acid. Again the phenoxythioacetyl-α-naphthylamine, which separated was collected on a funnel. It was redissolved in an excess of dilute sodium hydroxide, and oxidized to the desired base by the addition of aqueous potassium ferricyanide to the ice cold mixture until it was permanently yellow. The base was removed by extraction with ether. The ether layer was washed with water and then it was dried over potassium carbonate. After filtering, the filtrate was concentrated and the residue twice recrystallized from methyl alcohol. The almost colorless crystals had melting point 116°–118° C.

The phenoxyacetyl-α-naphthylamine and phenoxyacetyl-β-naphthylamine employed in Examples 12 and 11 were prepared as follows:

43 g. (1 mol.) of α-naphthylamine and 51 g. (1 mol.) of phenoxyacetyl chloride were mixed together. After the vigorous reaction had subsided the mixture was heated on the steam bath for 15 minutes. The product was removed from the flask, crushed and washed on the funnel with water and then it was recrystallized from methyl alcohol. The colorless crystals were obtained in an 80 per cent yield and they had melting point 129°–131° C.

43 g. (1 mol.) of β-naphthylamine, 51 g. (1 mol.) of phenoxyacetyl chloride and 20 cc. of pyridine were mixed together. The mixture was heated at the temperature of the steam-bath for 15 minutes. The product was removed from the flask, crushed and washed on the funnel with water. It was recrystallized from methyl alcohol. The colorless crystals were obtained in a 72 per cent yield and they had melting point 140°–142° C.

The cyclammonium quaternary salts containing, in the α-position to the quaternary nitrogen atom, a β-arylamino-α-alkoxy- or aryloxyvinyl group can be prepared by condensing a cyclammonium quaternary salt containing an alkoxymethyl or aryloxymethyl group with a diarylformamidine, in the presence of an anhydride of a carboxylic acid. The following example will serve to illustrate the preparation of such cyclammonium quaternary salts.

*Example 13.—2-(β-acetanilido-α-phenoxyvinyl)-benzothiazole methiodide*

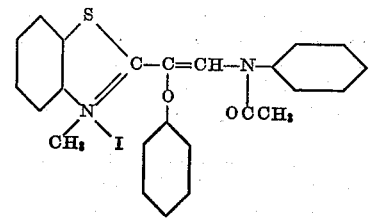

4.7 g. (1 mol.) of 2-phenoxymethylbenzothiazole methiodide, prepared by heating the base and methyl iodide together at the refluxing temperature for 12 hours, and 2.42 g. (1 mol.) of diphenylformamidine were heated together in 10 cc. of acetic anhydride at the refluxing temperature for 17 minutes. The dark brown mixture was chilled overnight at 0° C., and the crystals were collected on a funnel and washed with acetone. The residue was stirred, in a beaker, with 20 cc. of warm acetone and after chilling the suspension at 0° C., the brown product was washed on the funnel with acetone. It was used without further purification.

We have found that our new dyes spectrally sensitize photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver-bromiodide developing-out emulsions. In the foregoing examples, the extent to which gelatino-silver-bromiodide developing-out emulsions can be sensitized as well as the point of maximum sensitivity are pointed out in connection with the dye of each example. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of our new dyes. Where the dyes are quite insoluble in methyl alcohol, a mixture of acetone and pyridine is advantageously employed as a solvent. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory:

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

What we claim as our invention and desire to be secured by Letters Patent of the United States is:

1. The dimethine merocyanine dyes of the following general formula:

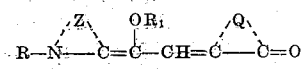

wherein R represents an alkyl group of the formula $C_nH_{2n+1}$ wherein $n$ represents a positive integer, $R_1$ represents a member selected from the group consisting of alkyl groups, aryl groups of the benzene series and aryl groups of the naphthalene series, Z represents the non-metallic atoms necessary to complete a heterocyclic nucleus selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series and Q represents the non-metallic atoms necessary to complete a heterocyclic nucleus selected from the group consisting of those of the rhodanine series and those of the 2-thio-2,4(3,5)-oxazoledione series.

2. The dimethine merocyanine dyes of the following general formula:

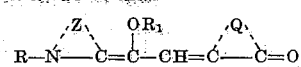

wherein R represents an alkyl group of the formula $C_nH_{2n+1}$ wherein $n$ represents a positive integer of from 1 to 2, $R_1$ represents an aryl group of the benzene series, Z represents the non-metallic atoms necessary to complete a heterocyclic nucleus selected from the group consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series and Q represents the non-metallic atoms necessary to complete a heterocyclic nucleus selected from the group consisting of those of the rhodanine series and those of the 2-thio-2,4(3,5)-oxazoledione series.

3. The dimethine merocyanine dyes of the following general formula:

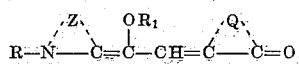

wherein R represents an alkyl group of the formula $C_nH_{2n+1}$ wherein $n$ represents a positive integer of from 1 to 2, $R_1$ represents an aryl group of the benzene series, Z represents the non-metallic atoms necessary to complete a heterocyclic nucleus of the benzothiazole series and Q represents the non-metallic atoms necessary to complete a heterocyclic nucleus of the rhodanine series.

4. The dimethine merocyanine dyes of the following general formula:

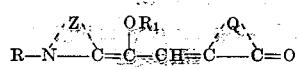

wherein R represents an alkyl group of the formula $C_nH_{2n+1}$ wherein $n$ represents a positive integer of from 1 to 2, $R_1$ represents an aryl group of the benzene series, Z represents the non-metallic atoms necessary to complete a heterocyclic nucleus of the benzoxazole series and Q represents the non-metallic atoms necessary to complete a heterocyclic nucleus of the rhodanine series.

5. The dimethine merocyanine dyes of the following general formula:

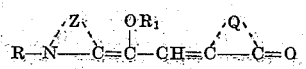

wherein R represents an alkyl group of the formula $C_nH_{2n+1}$ wherein $n$ represents a positive integer of from 1 to 2, $R_1$ represents an aryl group of the benzene series, Z represents the non-metallic atoms necessary to complete a heterocyclic nucleus of the benzoxazole series and Q represents the non-metallic atoms necessary to complete a heterocyclic nucleus of the 2-thio-2,4(3,5)-oxazoledione series.

6. The dimethine merocyanine dye of the following formula:

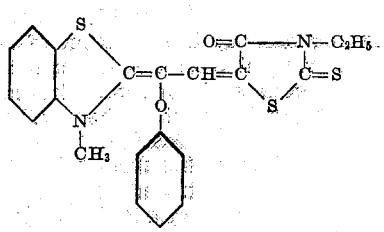

7. The dimethine merocyanine dye of the following formula:

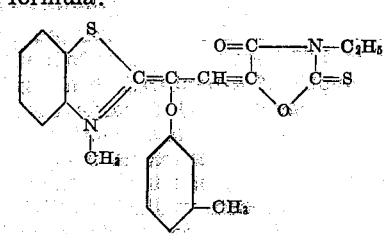

8. The dimethine merocyanine dye of the following formula:

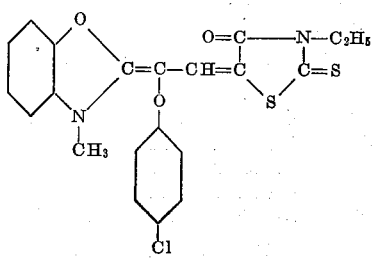

9. A process for preparing a dimethine merocyanine dye comprising condensing, in the presence of a basic condensing agent, a cyclammonium quaternary salt selected from those consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series containing in the α-position to the quaternary nitrogen atom a group selected from the group consisting of alkoxymethyl groups, aryloxymethyl groups of the benzene series and aryloxymethyl groups of the naphthalene series, with a heterocyclic compound selected from those represented by the following general formula:

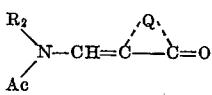

wherein Ac represents an acyl group, $R_2$ represents an aryl group and Q represents the non-metallic atoms necessary to complete a heterocyclic nucleus selected from the group consisting of heterocyclic nuclei of the rhodanine series and heterocyclic nuclei of the 2-thio-2,4(3,5)-oxazoledione series.

10. A process for preparing a dimethine merocyanine dye comprising condensing, in the presence of a basic condensing agent, a cyclammonium quaternary salt selected from those consisting of those of the benzoxazole series, those of the benzothiazole series, those of the benzoselenazole series, those of the α-naphthoxazole series those of the β-naphthoxazole series, those of the α-naphthothiazole series and those of the β-naphthothiazole series containing in the α-position to the quaternary nitrogen atom a group selected from the group consisting of alkoxymethyl groups, aryloxymethyl groups of the benzene series and aryloxymethyl groups of the naphthalene series, with a heterocyclic compound selected from those represented by the following general formula:

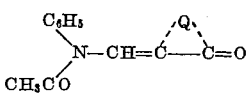

wherein Q represents the non-metallic atoms necessary to complete a heterocyclic nucleus selected from the group consisting of heterocyclic nuclei of the rhodanine series and heterocyclic nuclei of the 2-thio-2,4(3,5)-oxazoledione series.

11. A process for preparing a dimethine merocyanine dye comprising condensing, in the presence of a tertiary amine condensing agent, a cyclammonium quaternary salt selected from those consisting of those of the benzoxazole series, those of the benzothiazole series, those of the benzoselenazole series, those of the α-naphthoxazole series, those of the β-naphthoxazole series, those of the α-naphthothiazole series and those of the β-naphthothiazole series containing in the α-position to the quaternary nitrogen atom a group selected from the group consisting of alkoxymethyl groups, aryloxymethyl groups of the benzene series and aryloxymethyl groups of the naphthalene series, with a heterocyclic compound selected from those represented by the following general formula:

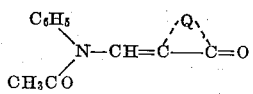

wherein Q represents the non-metallic atoms necessary to complete a heterocyclic nucleus selected from the group consisting of heterocyclic nuclei of the rhodanine series and heterocyclic nuclei of the 2-thio-2,4(3,5)-oxazoledione series.

12. A process for preparing a dimethine merocyanine dye comprising condensing, in the presence of a tertiary amine condensing agent, a cyclammonium alkyl quaternary salt of the benzothiazole series in which the alkyl group is of the formula $C_nH_{2n+1}$ wherein $n$ represents a positive integer of from 1 to 2, containing in the α-position an aryloxymethyl group of the benzene series with a heterocyclic compound selected from those represented by the following general formula:

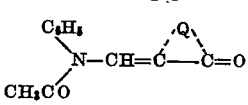

wherein Q represents the non-metallic atoms necessary to complete a heterocyclic nucleus of the rhodanine series.

13. A process for preparing a dimethine merocyanine dye comprising condensing, in the presence of a tertiary amine condensing agent, a cyclammonium alkyl quaternary salt of the benzoxazole series in which the alkyl group is of the formula $C_nH_{2n+1}$ wherein $n$ represents a positive integer of from 1 to 2, containing in the α-position an aryloxymethyl group of the benzene series with a heterocyclic compound selected from those represented by the following general formula:

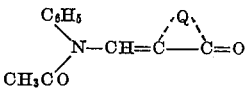

wherein Q represents the non-metallic atoms necessary to complete a heterocyclic nucleus of the rhodanine series.

14. A process for preparing a dimethine merocyanine dye comprising condensing, in the presence of a tertiary amine condensing agent, a cyclammonium alkyl quaternary salt of the benzoxazole series in which the alkyl group is of the formula $C_nH_{2n+1}$ wherein $n$ represents a positive integer of from 1 to 2, containing in the α-position an aryloxymethyl group of the benzene series with a heterocyclic compound selected from those represented by the following general formula:

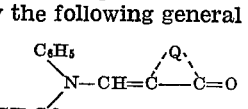

wherein Q represents the non-metallic atoms necessary to complete a heterocyclic nucleus of the 2-thio-2,4(3,5)-oxazoledione series.

15. A process for preparing a dimethine merocyanine dye comprising condensing, in the presence of a tertiary amine condensing agent, 2-(p-chlorophenoxymethyl)benzoxazole methomethylsulfate with 5-acetanilidomethylene-3-ethyl rhodanine.

16. A process for preparing a dimethine merocyanine dye comprising condensing, in the presence of a tertiary amine condensing agent, 2-(m-toloxymethyl)benzothiazole methomethylsulfate with 5-acetanilidomethylene - 3 - ethyl-2-thio-2,4(3,5)-oxazoledione.

17. A process for preparing a dimethine merocyanine dye comprising condensing, in the presence of a tertiary amine, a 2-aryloxymethylbenzothiazole methomethylsulfate where the aryloxy group is of the benzene series, with 5-acetanilidomethylene-3-ethyl rhodanine.

LESLIE G. S. BROOKER.
FRANK L. WHITE.

REFERENCES CITED

The following references are of record in the file of this patent:

UNITED STATES PATENTS

| Number | Name | Date |
|---|---|---|
| 2,083,804 | Zeh | June 15, 1937 |
| 2,156,464 | Schulz | May 2, 1939 |
| 2,170,803 | Brooker | Aug. 29, 1939 |
| 2,170,804 | Brooker | Aug. 29, 1939 |
| 2,265,908 | Kendall | Dec. 9, 1941 |

FOREIGN PATENTS

| Number | Country | Date |
|---|---|---|
| 466,097 | Great Britain | 1937 |

OTHER REFERENCES

Beilstein, vol. 27, page 110, 3 ed.